(12) United States Patent
Bruinius et al.

(10) Patent No.: US 11,667,513 B1
(45) Date of Patent: Jun. 6, 2023

(54) ACCESS CONTROL AND METERING OF LIQUID STORAGE TANKS

(71) Applicant: Liquid Solutions, Inc., Grand Rapids, MI (US)

(72) Inventors: Mark W. Bruinius, Ada, MI (US); Shaun Burket, Alto, MI (US)

(73) Assignee: Liquid Solutions, Inc., Grand Rapids, MI (US)

( * ) Notice: Subject to any disclaimer, the term of this patent is extended or adjusted under 35 U.S.C. 154(b) by 139 days.

(21) Appl. No.: 16/704,584

(22) Filed: Dec. 5, 2019

Related U.S. Application Data

(60) Provisional application No. 62/776,169, filed on Dec. 6, 2018.

(51) Int. Cl.
| | |
|---|---|
| *B67D 7/30* | (2010.01) |
| *G05B 19/042* | (2006.01) |
| *B67D 7/14* | (2010.01) |
| *B67D 7/02* | (2010.01) |
| *B67D 7/16* | (2010.01) |
| *B67D 7/22* | (2010.01) |
| *B67D 7/10* | (2010.01) |

(52) U.S. Cl.
CPC ............ *B67D 7/145* (2013.01); *B67D 7/0211* (2013.01); *B67D 7/10* (2013.01); *B67D 7/16* (2013.01); *B67D 7/224* (2013.01); *B67D 7/30* (2013.01); *G05B 19/042* (2013.01)

(58) Field of Classification Search
CPC ........ B67D 7/145; B67D 7/10; B67D 7/0211; B67D 7/30; B67D 7/16; B67D 7/224; B67D 7/04; B67D 7/08; B67D 7/34; B67D 2007/0442; B67D 7/00; B67D 7/067; G05B 19/042; G05B 2219/45076; G05B 2219/23258; G06Q 20/3278; G06Q 20/145; G06Q 20/20; G06Q 20/40; G06Q 20/322; G06Q 20/327; G06Q 20/405; G06Q 20/16; G06Q 20/28; G06Q 20/3255; H04W 12/06; H04W 12/08
See application file for complete search history.

(56) References Cited

U.S. PATENT DOCUMENTS 10,329,137 B1 * 6/2019 Prasad .................... G07F 9/002
10,954,117 B2 * 3/2021 Shock ...................... B67D 7/78
(Continued)

*Primary Examiner* — Darrin D Dunn
(74) *Attorney, Agent, or Firm* — Gardner, Linn, Burkhart & Ondersma LLP

(57) ABSTRACT

A fluid access and control system for controlling access to a fluid storage tank includes a pump, a valve, a communications device, and controller. The pump is configured to supply a fluid output from the fluid storage tank. The valve is configured to control the fluid output of the pump. The communications device is configured to communicate with both a portable electronic device and a remote server. The communications device receives an access request from the portable electric device and transmits the access request to the remote server for validation. The controller is configured to control the operation of the pump and valve as defined by control signals transmitted by the remote server and received by the communications device. The controller is further configured to activate the pump and open the valve when the access request has been validated by the remote server and a START switch is actuated.

20 Claims, 3 Drawing Sheets

(56) References Cited

U.S. PATENT DOCUMENTS

| | | | |
|---|---|---|---|
| 2011/0093118 A1* | 4/2011 | McSpadden | B67D 7/08 700/244 |
| 2012/0097510 A1* | 4/2012 | Mitchell | H01H 13/705 200/333 |
| 2013/0013431 A1* | 1/2013 | Fansler | G06Q 30/06 705/18 |
| 2014/0172179 A1* | 6/2014 | Baudin, Jr. | G06Q 20/145 700/283 |
| 2014/0216596 A1* | 8/2014 | Juhasz | B67D 7/78 141/94 |
| 2015/0032558 A1* | 1/2015 | Bonk | G06Q 20/326 705/21 |
| 2015/0120474 A1* | 4/2015 | Webb | B67D 7/348 705/18 |
| 2015/0143124 A1* | 5/2015 | Bergqvist | B67D 7/04 713/171 |
| 2015/0242855 A1* | 8/2015 | Vilnai | G07F 13/025 705/44 |
| 2015/0242969 A1* | 8/2015 | Pallas | G06Q 50/06 705/39 |
| 2015/0368088 A1* | 12/2015 | Patel | G06Q 30/0226 700/283 |
| 2016/0214852 A1* | 7/2016 | Collins | G01M 3/2815 |
| 2017/0188180 A1* | 6/2017 | Bretthauer | G07F 13/025 |
| 2017/0247241 A1* | 8/2017 | Blyth | B67D 7/16 |
| 2018/0016131 A1* | 1/2018 | Varini | G07F 13/025 |
| 2019/0244205 A1* | 8/2019 | Fieglein | G06Q 20/326 |
| 2019/0272524 A1* | 9/2019 | Rasmussen | G06Q 20/202 |
| 2020/0168025 A9* | 5/2020 | Racusin | G07F 13/02 |
| 2020/0175803 A1* | 6/2020 | Derby | G07F 13/025 |
| 2020/0189904 A1* | 6/2020 | Fieglein | G07F 9/023 |
| 2020/0236175 A1* | 7/2020 | Wang | G06Q 20/3278 |

* cited by examiner

ACCESS CONTROL AND METERING OF LIQUID STORAGE TANKS

CROSS-REFERENCE TO RELATED APPLICATION

The present application claims the filing benefits of U.S. provisional application Ser. No. 62/776,169, filed Dec. 6, 2018, which is hereby incorporated by reference herein in its entirety.

FIELD OF THE INVENTION

The present invention relates generally to devices used to permit controlled access to the contents of storage tanks, and in particular, to devices configured for the secure metered delivery of liquids from liquid storage tanks.

BACKGROUND OF THE INVENTION

Bulk storage tanks, such as above-ground liquid storage tanks, are used to store and dispense liquids, and typically include access ports that permit dispensing of their liquid contents. Such tanks may be temporary storage tanks that are delivered to a job site for a limited period of time, and some such tanks are not regulated and/or metered when dispensing their contents. For example, such tanks may store bulk fluids such as fracking fluids and saline solutions for industrial purposes, infrastructure projects, and the like.

SUMMARY OF THE INVENTION

The access and metering control apparatus of the present invention may be adapted for use on substantially any bulk storage container or tank, and may be particularly well suited to temporary above-ground bulk liquid storage tanks, such as may be used by a business that operates a fleet of temporary or portable storage tanks that are delivered to particular job sites for use of their contents. In an aspect of the present invention, such use is a controlled metered delivery of stored fluids. After a user's identification and billing information have been verified by a remote server, and a desired quantity of liquid selected, a local controller is enabled by the remote server to allow for the START and STOP selection of pump controls. A local fluid flow meter monitors the fluid delivery, with the dispensed fluid quantity reported to the remote server. Once the selected quantity of fluid has been delivered, the pump will be turned off and the supply valve closed. The quantity of fluid pumped may be monitored locally and reported to the remote server, with either the local controller or the remote server configured to deactivate the pump controls upon determining that a desired quantity of fluid has been delivered.

According to one form of the present invention, a fluid access control system includes a housing configured to securely enclose and support the fluid access control system. The fluid access control system includes a controller, a pump, a meter, a valve, and a communications device. The controller controls the operation of the pump and valve as defined by control signals transmitted by a remote server and received by the communications device. When an access request from an authorized user has been validated by the remote server, the controller will activate the pump and open the valve when a START switch is actuated. A quantity of fluid delivered is measured by the meter and reported to the controller. This fluid quantity measurement is also reported by the controller to the remote server. When the fluid quantity measurement equals the requested quantity value, the pump is deactivated and the valve is closed.

According to another form of the present invention, a fluid access and control system includes a pump, a valve, a communications device, and a controller. The pump is configured to supply a high-volume fluid output. The valve is configured to control the fluid output of the pump. The communications device is configured to communicate with both a portable electronic device and a remote server. The controller is configured to control the operation of the pump and valve as defined by control signals transmitted by the remote server and received by the communications device. The controller is further configured to activate the pump and open the valve when a user identification has been validated and a START switch is actuated.

In an aspect of the present invention, either of the local controller and the remote server are configured to monitor the reported fluid quantity measurement and are further configured to deactivate the pump and close the valve.

In another aspect of the present invention, the valve is a pneumatically operated valve that is supplied with pressurized air by a pneumatic pump. When the pneumatic pump is activated, a system air pressure increases, and the valve will open. When the pneumatic pump is deactivated, the system air pressure decreases, and the valve will close.

According to another form of the present invention, a method for controlling fluid access to a fluid storage tank includes receiving an access request that includes a user identification, account or payment information, and a requested fluid quantity value. The access request is communicated to a remote server that verifies the access request. With the access request approved by the remote server, a pump will be activated, and a valve opened when a START switch is actuated. A quantity of fluid delivered will be monitored. The monitored quantity value will be reported to the remote server. When the monitored quantity value approaches or equals the requested fluid quantity value, the pump will be deactivated and the valve closed so that a precise fluid quantity is dispensed.

Thus, the present invention provides for a controlled and metered delivery of fluids from a temporary storage tank. Upon receiving confirmation of a user's identification and payment arrangements, as well as receiving a requested quantity of liquid, a local controller is instructed by a remote server to activate a pump and open a valve that are configured to deliver fluids from the temporary storage tank when a START switch is actuated. A high output fluid delivery may then be controllable metered, with the pump deactivating and the valve closing when the requested quantity of fluid has been delivered.

These and other objects, advantages, purposes, and features of the present invention will become apparent upon review of the following specification in conjunction with the drawings.

DESCRIPTION OF THE PREFERRED EMBODIMENTS

The fluid access and control system of the present invention provides for secure access to, and a reliable metering of a fluid pumping system. A variety of different fluid pumping systems would benefit from secured access and control, such as high-volume delivery systems that deliver bulk quantities of low-cost fluids, as well as low-volume delivery systems that deliver small quantities of high-cost fluids. With the receipt and confirmation of a user's identification, payment arrangement, and a requested fluid quantity, a controller of the system is instructed to activate a pump and open a valve such that a selected volume of fluids may be delivered from a storage tank. In one embodiment, high volumes of fluids are delivered from a temporary storage tank. Upon validation of the user's identification and payment arrangements, the pump is activated, and the valve opened, when a START switch is actuated. The fluid output is monitored, with the pump deactivated and the valve closed when the requested fluid quantity has been delivered.

Figure 1:
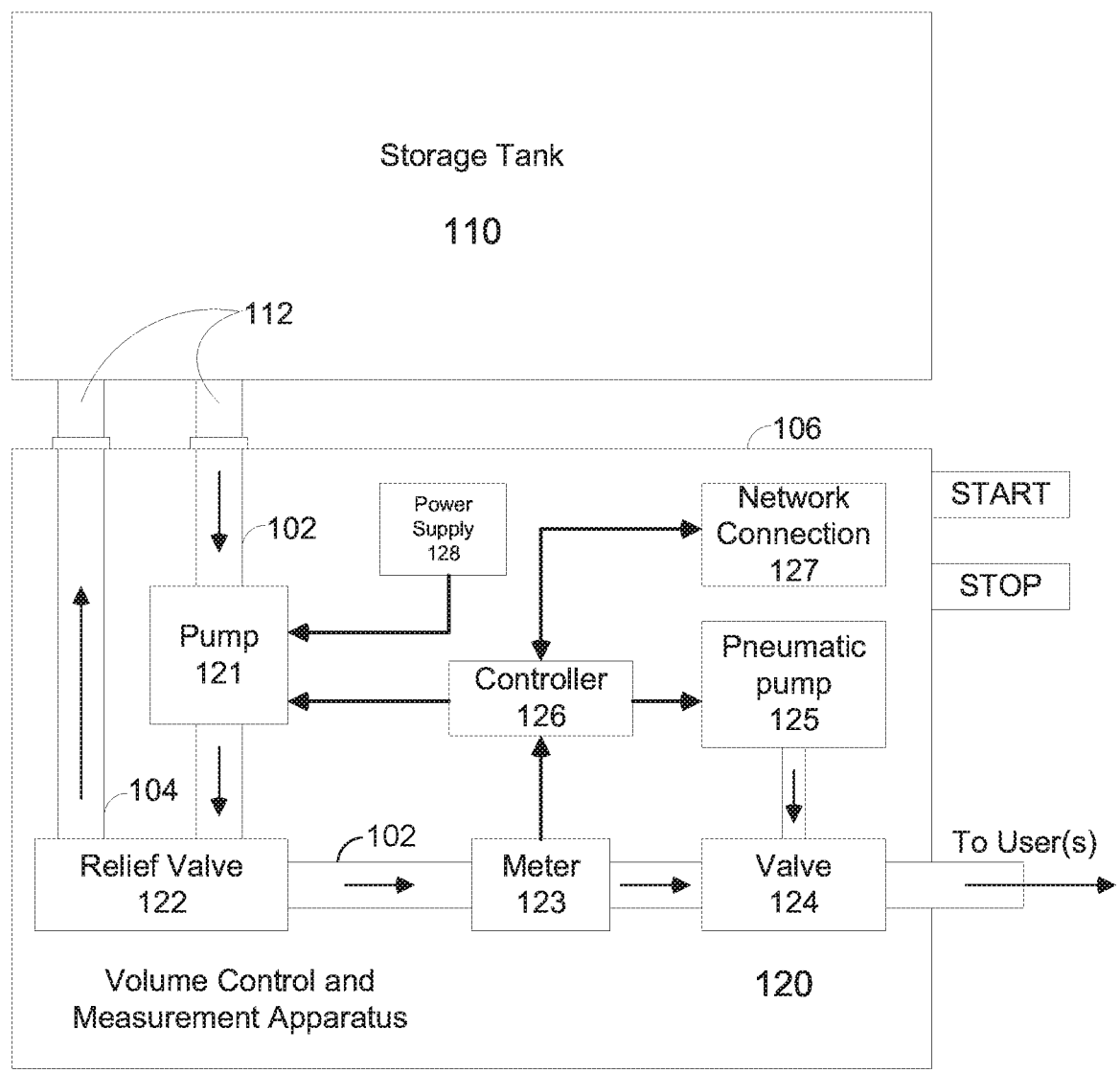
FIG. 1 is a block diagram of a storage tank and accompanying access and metering control apparatus in accordance with the present invention.
Figure 2:
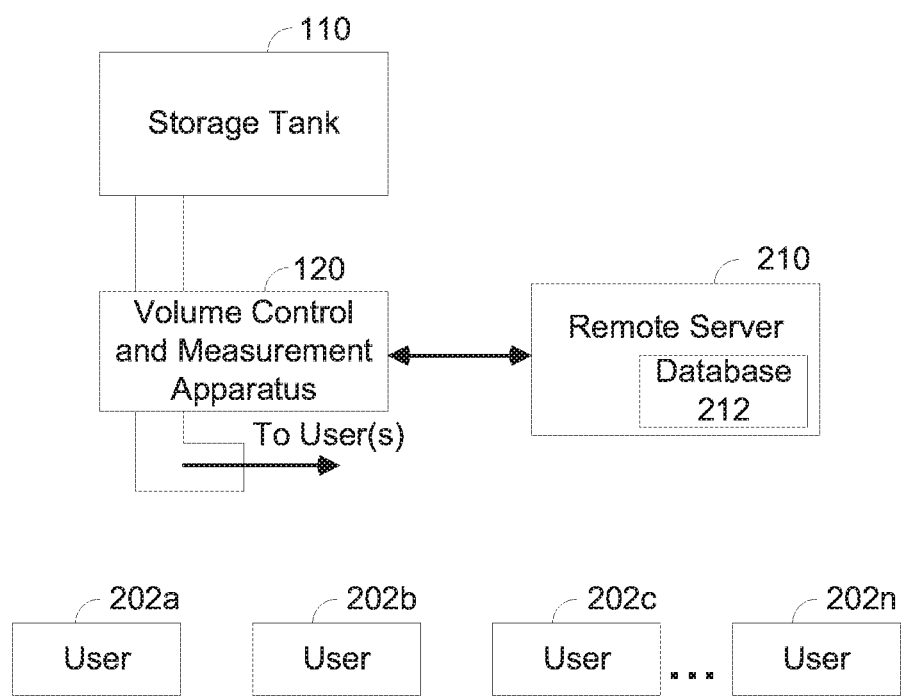
FIG. 2 is a block diagram of an access and control environment for the access and metering control apparatus of FIG. 1 in accordance with the present invention.

Referring now to the drawings and the illustrative embodiments depicted therein, a fluid access and control system 100 is provided for controlled and metered access to storage tanks 110 in an access and control environment 200 (see FIGS. 1 and 2). In an aspect of the present invention, the storage tank 110 is a temporary bulk storage tank that has been placed in a location for a limited period of time, which could range from days or weeks to months or years. For example, the storage tank 110 may have been placed in a central geographical location for a set of local customers/users 202a-202n that will use the liquid contents of the storage tank 110. Such customers/users 202 may be purchasing high volumes of brine solutions during the winter months or fracking fluids during a period of drilling.

An exemplary storage tank 110 may be configured as a 20,000-gallon bulk storage tank. However, other sizes and configurations of temporary and transportable bulk storage tanks are also anticipated. Thus, the storage tank 110 may represent a single tank, a plurality of tanks, or a single tank with multiple separate internal tanks or chambers or bladders. Such bulk storage tanks 110 may be configured for storing a variety of liquids. For example, the storage tank 110 may be configured for holding water-based products (e.g., brines, fracking fluids, and water), fuels (e.g., gasoline, alcohol, and diesel fuel blends), oils (e.g., cooking and lubrication), and chemicals, as well as other liquids. Therefore, embodiments of the present invention provide for the delivery of a variety of fluids, from the high-volume delivery of low-cost bulk products, to the low-volume delivery of high-cost products.

When a suitable storage tank 110 has been positioned at a desired location, a volume control and measurement apparatus 120 may be placed alongside and coupled to the storage tank 110. As illustrated in FIG. 1, plumbing connections 112 between the storage tank 110 and the volume control and measurement apparatus 120 provide an output line 102 from the storage tank 110 and an overflow relief line 104 back to the storage tank 110. Such plumbing connections 120 couple the storage tank 110 to the volume control and measurement apparatus 120. A variety of different fluid lines may be utilized, such as flexible or rigid, or combinations thereof, to couple the storage tank 110 to the volume control and measurement apparatus 120.

As illustrated in FIG. 1, the volume control and measurement apparatus 120 is self-contained within a housing 106. Such a housing 106 may be configured for indoor or outdoor use. Such housing 106 may therefore be weather resistant. The housing 106 may optionally include a weather resistant access hatch that provides easy access to an interior cavity of the housing 106. The access hatch may be locked shut. Because the housing 106 is generally a hollow member, the interior cavity will be substantially the entire internal volume of the housing 106. The housing 106 may be constructed of a metallic material that is light-weight yet weatherproof. Alternatively, the housing 106 may have a molded plastic construction.

The volume control and measurement apparatus 120 includes a pump 121 for pumping the fluid(s) stored in the storage tank 110. In an aspect of the present invention, the pump 121 is a high-volume electric pump configured to pump up to about 150 gallons/minute, although other flow rates are equally possible (e.g., low-volume flow rates are also possible). As illustrated in FIG. 1, the fluids are pumped through the output line 102 by the pump 121. The output line 102 passes through a relief valve 122 that is configured to vent the fluid back into the storage tank 110, via a relief line 104, when a detected fluid pressure in the output line 102 exceeds a maximum fluid pressure at the relief valve 122. Such a relief valve 122 prevents the fluid pressure in the output line 102 from building to the point that the output line 102 or other components of the volume control and measurement apparatus 120 are damaged due to an over-pressure condition. For example, the relief valve 122 is configured to route the pumped fluid back to the storage tank 110 should the pump 121 be energized without an output valve 124 being opened.

As illustrated in FIG. 1, after passing through the relief valve 122, the output line 102 is coupled to an output valve 124 that is configured to pass the pumped liquids to external hoses that may be configured for passing the pumped liquids to a user's storage tanks. An exemplary output valve 124 is a pneumatic actuated valve that is coupled to a pneumatic pump 125. As illustrated in FIG. 1, when the pneumatic pump 125 is activated, pressurized air is supplied to the output valve 124 for actuating the output valve 124. In one embodiment, the pneumatic pump 125 is configured to supply pressurized air at approximately 60 pounds per square inch (psi). Thus, when the pneumatic pump 125 is activated, 60 psi of air is applied to the pneumatically actuated output valve 124. The output valve 124 is also configured such that when in a default condition (when the air supplied is at ambient pressures), the output valve 124 is closed. Thus, pressurized air is required to open the output valve 124.

The volume control and measurement apparatus 120 also comprises a controller 126 configured to control access to the fluids stored in the storage tank 110, as well as metering the flow of pumped fluids, and supplying a metered quantity of fluids to a user 202. As illustrated in FIG. 1, the controller 126 is communicatively coupled to a network connection 127 that is configured to connect the volume control and measurement apparatus 120 to a remote server 210 (see FIG. 2). The network connection 127 is also configured to receive access requests and user information from users 202 (i.e., smart phones and portable electronic devices of the users 202 may communicate access requests and user information to the network connection 127). The remote server 210 may be accessed via the Internet. The remote server 210 further includes a database 212 for storing customer/user information. The remote server 210 and associated database 212 may be implemented in a cloud computing environment accessed via the Internet. An exemplary cloud computing environment allows for the storing and accessing of data, as well as the processing of that data, via the Internet. Alternatively, either of the remote server 210 and the database 212 may be implemented as part of a cloud computing solution for accessing requests and user information over the Internet.

Therefore, as illustrated in FIGS. 1 and 2, the controller 126 is configured to receive user information from one or more users 202 via their smart phones and/or personal electronic devices communicating with the network connection 127. The controller 126 is further configured to pass that user information to the remote server 210. Thus, the network connection 127 is configured to receive user requests/user information and pass that user information to the remote server 210. The remote server 210 is also configured to validate the received user information by accessing user account information stored in the database 212. The user information may include, for example, a customer identification or username and a pass code, word, key, personal identification number (PIN), or biometric data.

When the user information has been validated by the remote server 210 (and so notifies the controller 126), the controller 126 is configured to activate the pump 121 and to open the valve 124 when a START switch is subsequently actuated by the user 202. Thus, once the user request has been validated by the remote server 210, the user 202 actuating the START switch results in the pump 121 activating and the valve 124 opening. Note that even with the user request validated by the remote server 210, the controller 126 will not activate the pump 121 or open the valve 124 until the user 202 actuates the START switch. Similarly, until the user request has been validated by the remote server 210, the controller 126 will not activate the pump 121 or open the valve 124 even if the user 202 has actuated the START switch.

As illustrated in FIG. 1, the volume control and measurement apparatus 120 also comprises a meter 123 that is configured to meter the flow of fluid through the output line 102 and to provide a fluid quantity measurement to the controller 126. The fluid quantity measurement may be sent to the remote server 210 via the network connection 127. In one embodiment, the meter 123 is configured to output a stream of "pulses," where each pulse is output for each individual quantity or volume of fluid that passes through the meter 123. Such a correlation between the stream of pulses and the quantity of fluid measured is dependent upon a diameter of the output line 102 and a fluid pressure provided by the pump 121. Thus, the meter 123 is configured to output the fluid quantity measurement as a stream of pulses. This stream of pulses is received by the controller 126 and may be forwarded to the remote server 210 via the network connection 127. As discussed herein, the fluid measurement may be monitored locally by the controller 126 and/or monitored externally by the remote server 210.

The remote server 210 is configured to compare the fluid quantity measurement (e.g., a stream of pulses) to a desired fluid quantity value (e.g., a desired quantity of pulses) that was supplied by the user 202 (as a desired quantity value) along with the user account information. When the remote server 210 determines that the fluid quantity measurement will reach the desired fluid quantity value, the remote server 210 is configured to command the controller 126 to cease the pumping operation (i.e., shut off the pump 121 and close the valve 124) such that the fluid quantity measurement approximately equals the desired fluid quantity value within a set tolerance level that takes into account any lag between the volume control and measurement apparatus 120 and the remote server 210. Optionally, the controller 126 is configured to manage the fluid metering locally by monitoring the fluid quantity measurement and shutting off the pump 121 and closing the valve 124 when the fluid quantity measurement reaches the desired fluid quantity value. The fluid delivery, as controlled by the volume control and measurement apparatus 120 may be "weights and measures certified," such that the fluid quantity measurement at pump/valve shutoff will be within less than 1% of the desired fluid quantity value.

Alternatively, when a desired fluid quantity value is not provided by the user 202, the controller 126 is configured to receive the fluid quantity measurement from the meter 123 and pass the fluid quantity measurement on to the remote server 210 for billing and/or payment purposes. When a desired fluid quantity value is not provided by the user 202, the controller 126 may be configured to keep the pump 121 activated and the valve 124 open until the user 202 actuates a STOP switch on the housing 106. Alternatively, the controller 126 may be configured to keep the pump 121 activated and the valve 124 open until either the user 202 actuates the STOP switch or the fluid quantity measurement reaches a default maximum fluid quantity value, whichever comes first. Regardless of the method used, when a fluid quantity measurement has been passed to the remote server 210 for billing and/or payment purposes, a receipt may be generated by the controller 126 and transmitted to the smartphone or personal electronic device of the user 202 via the network connection 127.

The user information may include a user's financial information. Such financial information may include a user's financial account that is billed to the user or credit card information for immediately billing the user's credit card for the desired quantity of fluid to be pumped. Optionally, a preset maximum amount is prebilled to the user's credit card before the user's access request is validated.

The network connection 127 is also configured to provide a communications link between the user 202 and the remote server 210 (whether the remote server 210 is physically present at a remote location or implemented in the Internet via cloud computing technologies and methods). In an aspect of the present invention, the communications link may be a connection between a user's cell phone or similar personal electronic device and the network connection 127. Such a communications link may be implemented via a cellular or similar wireless communications system. Optionally, the communications link may be achieved with any of a Wi-Fi, Bluetooth, or near field communication (NFC) wireless connection. Other exemplary embodiments may also include additional features, such as the use of credit cards at an optional local point of sale terminal coupled to the volume control and measurement apparatus 120.

A software application on the user's cellphone or personal electronic device may be configured for establishing the communications link between the user's cellphone and the remote server 210. Optionally, regardless of the method used for metering the quantity of fluid pumped, the application on the user's cellphone or other portable electronic device may also receive the stream of pulses, such that the user's cellphone or personal electronic device may monitor and display the current fluid quantity measurement during the pumping operation in real time or nearly real time.

Figure 3:
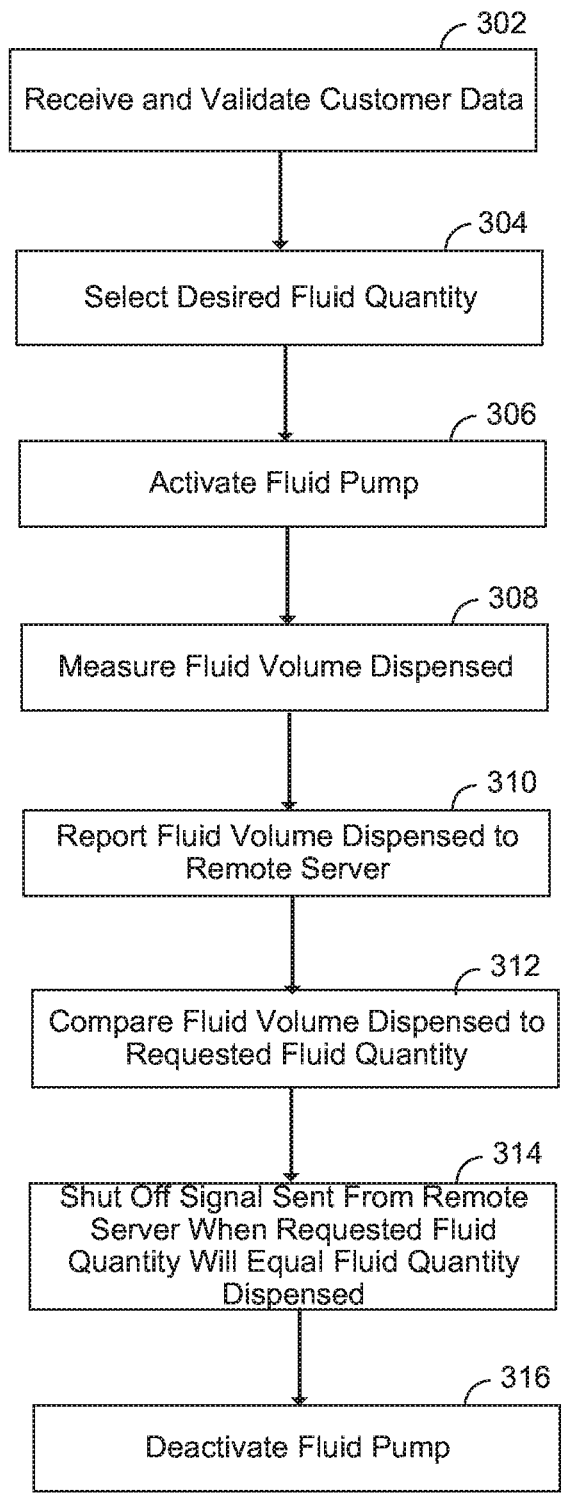
FIG. 3 are steps to a method for controlling access to and metering the delivery of a liquid contained in a liquid storage tank in accordance with the present invention.

An exemplary method for controlling access to and metering the delivery of a fluid contained within a storage tank is illustrated in FIG. 3. In step 302 of FIG. 3, customer data is received and validated. Such a step may be initiated when a user 202 requests a sale or order with an exemplary software application on the user's cellphone or other portable electronic device. The sale or order request may include a user's identification information (username/password or code) which are used to identify the user's account stored in the database 212 of the remote server 210. As discussed herein, the remote server 210 and/or database 212 may be implemented as part of an Internet accessed cloud computing solution.

In step 304 of FIG. 3, once the user's account information has been validated (e.g., by validating the username/password), a desired fluid quantity value is selected. The desired fluid quantity may be any quantity of fluid desired. Optionally, the desired fluid quantity may be left at a default level, such that no user selected desired fluid quantity value is provided.

In step 306 of FIG. 3, once the user's account information has been validated and a desired fluid quantity selected, the pump 121 will be activated and the valve 124 opened upon the subsequent actuation of the START switch. Even with the access request validated, the pump 121 will not be activated, nor the valve 124 opened until the actuation of the START switch. Similarly, without an access request validation, actuating the START switch will not activate the pump 121, nor will the valve 124 be opened. With the validation and fluid quantity selection criteria met, once the user actuates the START switch on the volume control and measurement apparatus housing 106, the pump 121 will be activated and the valve 124 opened. The pump 121 and valve 124 may be activated and opened, respectively, simultaneously.

In step 308 of FIG. 3, a fluid quantity dispensed is measured by the meter 123 to provide a "fluid quantity measurement." The fluid quantity dispensed may be measured by the meter 123 and output as a stream of pulses, with each pulse representing a particular quantity of fluid measured by the meter 123. Note that the desired fluid quantity value would then be represented as a particular quantity of pulses.

In step 310 of FIG. 3, the fluid quantity measurement is reported via the network connection 127 to the remote server 210. In one embodiment, this fluid quantity measurement is reported as a stream of pulses. In step 312 of FIG. 3, the current fluid quantity measurement is compared to the desired fluid quantity. In one exemplary embodiment, a measured stream of pulses is compared to the desired quantity of pulses. Thus, a desired fluid quantity will be met when the measured quantity of pulses received equals the desired quantity of pulses.

In step 314 of FIG. 3, when the quantity of pulses received equals the desired quantity of pulses, a shut-off signal is sent by the remote server 210 to the controller 126. Optionally, to account for a communications lag between the controller 126 and the remote server 210 and any mechanical lag of the valve 124, the shut-off signal may be sent by the remote server 210 in advance of the quantity of pulses received equaling the desired quantity of pulses, such that the pumping operation is stopped when the fluid quantity measurement equals the desired fluid quantity. The desired fluid quantity level may be a default level. In a default level, the pumping operation will continue until either a default fluid quantity value is reached, or a STOP switch on the housing 106 of the volume control and measurement apparatus 120 has been actuated, whichever comes first.

In step 316 of FIG. 3, the pump 121 is deactivated by the controller 126. When the pump 121 is deactivated, the valve 124 is also closed. As illustrated in FIG. 1, the controller 126 closes the valve 124 by shutting off the pneumatic pump 125.

Thus, embodiments of the present invention provide for a controlled and metered delivery of fluids from a storage tank (e.g., a temporary storage tank). Upon receiving confirmation of a user's identification and payment arrangements, a local controller is instructed by a remote server (which validated the user's identification and payment arrangements) to activate a pump and valve configured to deliver fluids from the storage tank when a START switch is subsequently actuated. A fluid delivery (such as a high-volume delivery) may then be controllably delivered, with the pump being deactivated and the valve closed when either a requested quantity of fluid has been delivered or a STOP switch has been actuated.

Changes and modifications in the specifically-described embodiments can be carried out without departing from the principles of the present invention, which is intended to be limited only by the scope of the appended claims, as interpreted according to the principles of patent law, including the doctrine of equivalents.

The invention claimed is:

1. A fluid access and control system for controlling access to a fluid storage tank, the fluid access and control system comprising:
   a pump configured to supply a fluid output from the fluid storage tank;
   a valve configured to control the fluid output of the pump;
   a communications device which communicates with both a portable electronic device and a remote server, wherein the communications device is configured to receive an access request from the portable electronic device and transmit the access request to the remote server for validation, wherein the communications device is configured to communicate wirelessly with the portable electronic device and to communicate with the remote server via an Internet connection;
   a controller configured to control the operation of the pump and valve as defined by control signals transmitted by the remote server and received by the communications device;
   wherein the controller is further configured to activate the pump and open the valve when the access request has been validated by the remote server and a start switch has been subsequently actuated, and wherein the controller is configured to keep the pump deactivated and to keep the valve closed when the start switch has been actuated, if the access request has not been validated by the remote server.

2. The fluid access and control system of claim 1 further comprising a meter configured to measure a quantity of fluid output from the fluid storage tank to provide a fluid quantity measurement, wherein the meter is further configured to output a stream of pulses as an indication of the fluid quantity measurement.

3. The fluid access and control system of claim 2, wherein the access request comprises a user identification and a desired fluid quantity value, and wherein the controller is configured to receive the fluid quantity measurement and compare it to the desired fluid quantity value.

4. The fluid access and control system of claim 3, wherein the controller is configured to deactivate the pump and close the valve when either the fluid quantity measurement equals the desired fluid quantity, or a stop switch has been subsequently actuated.

5. The fluid access and control system of claim 2, wherein the access request comprises a user identification and a desired fluid quantity value, wherein the controller is configured to transmit the fluid quantity measurement to the remote server, and wherein the remote server is operable to compare the fluid quantity measurement to the desired fluid quantity value.

6. The fluid access and control system of claim 5, wherein the remote server is configured to transmit a deactivation signal to the controller to deactivate the pump and close the valve when the fluid quantity measurement equals the desired fluid quantity value.

7. The fluid access and control system of claim 1 further comprising a pneumatic pump configured to supply pressurized air as controlled by the controller, wherein the valve is a pneumatic valve and is configured to open when supplied with the pressurized air.

8. The fluid access and control system of claim 1, wherein the pump is configured to pump approximately 150 gallons/minute.

9. The fluid access and control system of claim 1 further comprising a weather resistant housing configured to securely enclose and support the fluid access and control system.

10. A fluid access and control system for controlling access to a fluid storage tank, the fluid access and control system comprising:
   a weather resistant housing configured to securely enclose and support the fluid access and control system;
   a fluid pump configured to supply a fluid output from the fluid storage tank;
   a pneumatic valve configured to control the fluid output of the fluid pump;
   a pneumatic pump configured to supply pressurized air, wherein the pneumatic valve is configured to open when supplied with the pressurized air;
   a communications device which communicates with both a portable electronic device and a remote server, wherein the communications device is configured to receive an access request from the portable electronic device and transmit the access request to the remote server for validation, wherein the communications device is configured to communicate wirelessly with the portable electronic device and to communicate with the remote server via an Internet connection; and
   a controller configured to control the operation of the fluid pump and the pneumatic pump as defined by control signals transmitted by the remote server and received by the communications device;
   wherein the controller is further configured to activate the fluid pump and the pneumatic pump when the access request has been validated by the remote server and a start switch has been subsequently actuated, wherein activating the pneumatic pump opens the pneumatic valve, and wherein the controller is configured to keep the fluid pump deactivated and to keep the pneumatic valve closed when the start switch has been actuated if the access request has not been validated by the remote server.

11. The fluid access and control system of claim 10, further comprising a meter configured to measure a quantity of fluid output from the fluid storage tank to provide a fluid quantity measurement, wherein the meter is further configured to output a stream of pulses as an indication of the fluid quantity measurement, and wherein the meter is retained and supported within the weather resistant housing.

12. The fluid access and control system of claim 10, wherein the access request comprises a user identification and a desired fluid quantity value, wherein the controller is configured to receive the fluid quantity measurement and compare it to the desired fluid quantity value, wherein the controller is configured to deactivate the fluid pump and the pneumatic pump when either the fluid quantity measurement equals the desired fluid quantity, or a stop switch has been subsequently actuated, and wherein deactivating the pneumatic pump closes the pneumatic valve.

13. A method for controlling a fluid output from a fluid storage tank, said method comprising:
   receiving, from a portable electronic device, an access request that includes a user identification for a user requesting a fluid output from the fluid storage tank;
   transmitting, from a communication device, the access request to a remote server;
   verifying, with the remote server, the access request by comparing user information in the access request to a user account in a database of the remote server;
   controlling the operation of the pump and valve as defined by control signals transmitted by the remote server and received by the communication device; and
   activating a pump configured to provide fluid output from the fluid storage tank and opening a valve configured to control the fluid output, when the access request has been validated by the remote server and a start switch has been subsequently actuated, and wherein the pump remains deactivated and the valve closed when the start switch has been actuated, when the access request has not been validated by the remote server.

14. The method of claim 13 further comprising measuring, with a meter, a quantity of fluid output from the fluid storage tank to provide a fluid quantity measurement, wherein the meter is configured to output a stream of pulses as an indication of the fluid quantity measurement.

15. The method of claim 14, wherein the access request comprises a user identification and a desired fluid quantity value, and wherein the method further comprises comparing the fluid quantity measurement to the desired fluid quantity value.

16. The method of claim 15 further comprising deactivating the pump and closing the valve when either the fluid quantity measurement equals the desired fluid quantity value, or a stop switch has been subsequently actuated.

17. The method of claim 14, wherein the access request comprises a user identification and a desired fluid quantity value, wherein the method further comprises transmitting the fluid quantity measurement to the remote server, and wherein the remote server is configured to compare the fluid quantity measurement to the desired fluid quantity value.

18. The method of claim 17 further comprising deactivating the pump and closing the valve when either a deactivation signal is received from the remote server or a stop switch has been subsequently actuated, wherein the remote server is configured to transmit the deactivation signal to deactivate the pump and close the valve when the fluid quantity measurement equals the desired fluid quantity value.

19. The method of claim 13, wherein the valve is configured as a pneumatic actuated valve that opens when supplied with pressurized air from a pneumatic pump.

20. The method of claim 13, wherein the pump is configured to pump approximately 150 gallons/minute.

* * * * *